(12) United States Patent
Fasula et al.

(10) Patent No.: US 8,877,836 B2
(45) Date of Patent: Nov. 4, 2014

(54) MICROSPHERE BASED WALL REPAIR COMPOUND

(75) Inventors: Adam Fasula, Lansdale, PA (US); James Bohling, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 206 days.

(21) Appl. No.: 13/489,523

(22) Filed: Jun. 6, 2012

(65) Prior Publication Data

US 2013/0143980 A1 Jun. 6, 2013

Related U.S. Application Data

(60) Provisional application No. 61/494,658, filed on Jun. 8, 2011.

(51) Int. Cl.
| | | |
|---|---|---|
| *C09D 7/12* | (2006.01) | |
| *C09D 17/00* | (2006.01) | |
| *C08L 101/12* | (2006.01) | |
| *C09D 5/34* | (2006.01) | |

(52) U.S. Cl.
CPC ............ *C09D 7/1291* (2013.01); *C09D 7/1275* (2013.01); *C09D 7/125* (2013.01); *C09D 5/34* (2013.01); *Y10S 524/926* (2013.01); *Y10S 977/779* (2013.01); *Y10S 977/773* (2013.01)
USPC ........... 523/223; 524/501; 524/800; 524/926; 977/779; 977/773

(58) Field of Classification Search
USPC ........... 524/501, 800, 926; 523/223; 977/779, 977/773
See application file for complete search history.

(56) References Cited

U.S. PATENT DOCUMENTS

| | | | |
|---|---|---|---|
| 2,986,544 A | 5/1961 | Driscoll | |
| 3,527,729 A * | 9/1970 | Olson et al. | 523/220 |
| 4,069,186 A * | 1/1978 | Ramig | 523/221 |
| 6,080,802 A * | 6/2000 | Emmons et al. | 523/205 |
| 6,545,066 B1 | 4/2003 | Immordino, Jr. et al. | |
| 7,052,544 B2 | 5/2006 | Langford | |
| 7,902,272 B2 * | 3/2011 | Ben-Moshe et al. | 523/171 |
| 2008/0097018 A1 * | 4/2008 | Stratton | 524/425 |

FOREIGN PATENT DOCUMENTS

| | | |
|---|---|---|
| DE | 19834194 A1 | 2/2000 |
| DE | 10321079 A1 | 12/2004 |
| EP | 0955323 A1 | 11/1999 |
| EP | 2213706 A1 | 8/2010 |
| WO | 2004099330 A1 | 11/2004 |
| WO | 2007146418 A2 | 12/2007 |

* cited by examiner

*Primary Examiner* — Satya Sastri
(74) *Attorney, Agent, or Firm* — William S. Reid

(57) ABSTRACT

The present invention is a drying composition comprising spherical beads and a stable aqueous dispersion of polymer particles and also a dried composition of the spherical beads and a polymer film. The composition is useful as a wall repair formulation.

10 Claims, No Drawings

MICROSPHERE BASED WALL REPAIR COMPOUND

BACKGROUND OF THE INVENTION

Interior walls of residential and commercial buildings often require the use of wallboard panels that are attached to studs with nails or other fasteners. Joints between adjacent panels are filled using a joint compound to conceal the joints. The procedure for concealing joints and producing a smooth seamless wall surface typically includes applying the compound within the joint or seam formed by abutting panels; reinforcing tape material is then embedded within the joint compound, which is then allowed to harden. After hardening, a second layer of joint compound is applied over the joint and tape to completely fill the joint and provide a smooth surface. After this layer is allowed to harden, the joint compound is sanded smooth to eliminate surface irregularities. Joint compound can also be used to conceal other defects caused by nails or screws or to repair other imperfections or damages in the wallboard. Multiple applications of joint compound are often required to address problems associated with reduction of compound volume upon drying (shrinkage) such as cracking of the dried coating and minimizing telegraphing.

A variety of drywall joint compounds are known in the art. For example, U.S. Pat. No. 7,052,544 discloses a wall repair compound, which, when sanded, generates a lower level of airborne particles than conventional joint compounds. Nevertheless, a need still exists in the art for joint compounds that are easier to apply, and require less tedium in producing smooth defect-free surfaces with a minimum of shrinkage of the dried coating.

SUMMARY OF THE INVENTION

The present invention addresses a need in the art by providing a drying composition comprising spherical beads and a stable aqueous dispersion of polymer particles, wherein
  a) the spherical beads are characterized by: i) not being film-forming at ambient temperature; ii) having a uniformity coefficient of not greater than 1.5; iii) having a volume average particle size in the range of from 1 μm to 1 mm;
  b) the dispersion of polymer particles is characterized by: i) being film-forming at ambient temperature; ii) having a solids content in the range of from 10 to 65%; iii) having a volume average particle size in the range of 20 nm to 500 nm, with the proviso that the volume average particle size of the beads are at least 8 times greater than the volume average particle size of the polymer particles; and
  c) the volume of the stable aqueous dispersion of polymer particles is in the range of from 20 to 60% based on the volume of the stable aqueous dispersion and the beads.

DETAILED DESCRIPTION OF THE INVENTION

In a first aspect, the present invention is a drying composition comprising spherical beads and a stable aqueous dispersion of polymer particles, wherein
  a) the spherical beads are characterized by: i) not being film-forming at ambient temperature; ii) having a uniformity coefficient of not greater than 1.5; and iii) having a volume average particle size in the range of from 1 μm to 1 mm;
  b) the dispersion of polymer particles is characterized by: i) being film-forming at ambient temperature; ii) having a solids content in the range of from 10 to 65%; and iii) having a volume average particle size in the range of 20 nm to 500 nm, with the proviso that the volume average particle size of the beads are at least 8 times greater than the volume average particle size of the polymer particles; and
  c) the volume of the stable aqueous dispersion of polymer particles is in the range of from 20 to 60% based on the volume of the stable aqueous dispersion and the beads.

As used herein, the term "spherical beads" is used to refer to beads with a substantially spherical shape. The beads are non-film-forming at ambient temperature, may be inorganic or organic, and may also be gelular or macroporous. Preferably, the beads are polymeric organic beads, examples of which include polystyrene; styrene-butadiene copolymer; polystyrene-divinyl benzene; polyacrylates such as polymethyl methacrylate; polyolefins such as polyethylene and polypropylene; polyvinyl chloride; polyvinylidene chloride; polyurethanes; and polyureas.

Preferably, the polymeric organic beads are either: (a) particles having $T_g$ from 75° C. to 150° C.; (b) particles having at least 0.5% polymerized residues of crosslinkers; or c) a combination thereof. When the particles have a $T_g$ from −50° C. to 75° C., preferably the particles have at least 0.5% residues of crosslinkers, more preferably at least 1%, more preferably at least 2%, and preferably at least 5%. Particles having $T_g$ from 75° C. to 150° C. may contain the amounts of crosslinker residues described above or may have much lower levels of crosslinker residues. The polymeric particles also may be highly crosslinked and have a high $T_g$, for example, particles formed by polymerization of divinylaromatic monomers (e.g., divinylbenzene), or monomer mixtures having large amounts of divinylaromatic monomers, preferably at least 30%, more preferably at least 50%, more preferably at least 70%, and most preferably at least 80%, in combination with other monomers, preferably styrenic or acrylic monomers.

Polymeric organic spherical beads may also include functional groups that impart favorable properties to the subsequently applied coating, such as stain and abrasion resistance. Examples of such functional groups include cationic groups, most notably quaternary ammonium salts. Monomer A is a specific monomer that can be used to form such a cationic group.

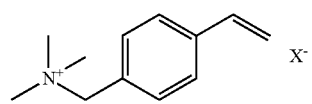

A where X is a counterion.

The spherical beads have a uniformity coefficient of not greater than 1.5, preferably not greater than 1.2, more preferably not greater than 1.1, and most preferably not greater than 1.05. Uniformity coefficient (UC) is calculated as follows:

$$UC = d_{60}/d_{10}$$

where $d_{60}$ is the particle diameter at which 60% of the particles by volume have a smaller diameter; and $d_{10}$ is the particle diameter at which 10% of the particles by volume have a smaller diameter.

The polymer beads of the composition of the present invention can be tailored to the desired uniformity by suspension polymerization using vibrational jetting, as described, for example, in U.S. Pat. No. 4,444,961 (especially from column 2, line 45 to column 3 line 68), U.S. Pat. No. 7,947,748, and U.S. 2007/0027222. The beads can also be prepared by seed expansion as described in U.S. Pat. No. 4,441,925, column 3, line 63 to column 5, line 8. In another embodiment, the polymer beads have a volume average particle size in the range of 5 to 600 μm.

Alternatively, the beads are sufficiently uniform in size to have a void fraction at maximum packing of greater 20%. As the uniformity coefficient approaches perfect uniformity (UC=1), the packed void fraction approaches 39.5%, which is the void fraction found in a hexagonally packed lattice of perfectly uniform spheres. Higher uniformity of the spherical beads is desirable to improve wet Bingham fluid behavior, to minimize shrink on drying, and to increase dry tensile strength.

The stable aqueous dispersion of polymer particles (also known as a latex) is film forming at ambient temperature. The latex has a sufficiently high solids content to form a film on the spherical beads; preferably, the solids content is from 10 to 65%, more preferably from 20 to 55%, and most preferably from 35 to 50% by weight, based on the weight of the water and polymer particles.

The volume average particle size of the polymer particles is in the range of 20 to 500 nm, with the proviso that the volume average particle size of the spherical beads is at least 8 times greater than the volume average particle size of the polymer particles. More preferably, the volume average particle size of the polymer particles is in the range of 100 to 300 nm. The latex is film forming at room temperature and preferably has a $T_g$ in the range of −40° C. to about 10° C., more preferably in the range of −30° C. to about 0° C. Examples of suitable latexes include acrylic; styrene; vinyl ester, including vinyl acetate; styrene-acrylic; ethylene-vinyl ester, including ethylene-vinyl acetate latexes.

The volume of the aqueous dispersion is in the range of from 20 to 60 v/v %, preferably from 30 to 50 v/v %, and more preferably 40 to 45 v/v %, based on the volume of the dispersion and the spherical beads. Where the packed void fraction of the spherical beads exceeds the volume of latex, it is still possible to make useful compositions through entrainment of air in the latex; however, it is preferred that the volume of latex be in slight excess, preferably a 5 to 15 v/v % excess, of the packed void fraction volume.

The composition of this aspect of the present invention preferably exhibits Bingham plastic fluid behavior, with zero flow below its yield strength, then steep shear thinning. This viscosity profile allows the composition to be easily manipulated because less force is required to apply the composition in a controlled fashion as compared to conventional joint compounds. Because of the uniformity of the particle size of the spherical beads, the composition tends to absorb the applied force evenly and efficiently.

When the composition is allowed to dry, the fine film-forming polymeric particles adhere to each other, to the spherical beads, and to the surface the composition contacts, thereby forming a matrix of tightly packed, fused beads, with a minimum of shrinkage. The reduction in shrinkage allows for the application of a thicker coat, as compared to multiple applications of thin coats, as required by conventional technology. Preferably, the volume of the dried composition is at least 85%, more preferably at least 95% the volume of the drying composition.

In a second aspect, the present invention is a dried composition comprising spherical beads and a polymer, wherein
a) the spherical beads are characterized by: i) not being film-forming at ambient temperature; ii) having a uniformity coefficient of not greater than 1.5; iii) having a volume average particle size in the range of from 1 μm to 1 mm; and b) the volume of polymer is in the range of from 2 to 40 volume % based on the volume of the thermoplastic polymer and the beads.

Preferably, the volume of polymer is in the range of from 5 to 40 volume %, more preferably from 15 to 25 volume %, based on the volume of the thermoplastic polymer and the beads

EXAMPLES

The following examples are for illustrative purposes only and are not intended to limit the scope of the invention. The styrene-divinyl benzene beads (91.8% styrene; 8.2% divinyl benzene, by weight, using t-butyl peroxy-2-ethyl hexanoate (0.036 weight %) and t-butyl peroxybenzoate (0.048 weight %) as iniators) were prepared by a jetting technique as disclosed in U.S. Pat. No. 4,444,961.

Example 1

Preparation of Crack Resistant Low Shrink Drying Composition

A. Dry Ingredients
Jetted styrene/divinyl benzene copolymer beads (120 g, 150 μm diameter, UC=1.03) were added to a pourable container along and mixed with WALOCEL™ CRT40000 Dry Powder HEC rheology modifier (A Trademark of The Dow Chemical Company, 0.1 g).
B. Wet Ingredients
To a blend of RHOPLEX™ EC-2885 Elastomeric Binder (A Trademark of The Dow Chemical Company, 64.5 g) and water (15.25 g) were added Foamstar A-34 defoamer (0.1 g) and TERGITOL™ 15-S-20 Surfactant (A Trademark of The Dow Chemical Company, 0.1 g), followed by ZnO (0.2). The pH of the mixture was adjusted to 9 with ammonia and mixed for 15 min, using a disperser mixer, so that the ZnO was blended homogeneously.
C. The Drying Composition
Preparation A (the bead mix) was poured slowly with gently mixing into Preparation B (the wet pre-mix) to minimize entrainment of air bubbles. As the last portion of the bead mix was added, agitation was stopped and final beads were pushed into the mixture with a rubber spatula.
D. Patching a Hole
A test hole was prepared by tacking a 6" plastic square with a 3"-diameter, ¼"-deep cylindrical hole to a piece of ½" thick interior drywall. To fill the hole, the drying composition was scooped onto a standard tape knife and spread into the hole with a knife. A smoothing pass of the blade across the hole was done to smooth out the surface of the drying composition to form a plane across the face of the drywall hole. After the composition was allowed to dry at room temperature overnight, it was inspected for shrinkage and cracking, neither of which were observed. No change was observed over subsequent weeks, as the sample did not shrink or crack.

Example 2

Preparation of Crack Resistant Low Shrink Drying Composition

A. Dry Ingredients
Jetted styrene/divinyl benzene copolymer beads (120 g, 150 μm diameter, UC=1.03) were added to a pourable container.
B. Wet Ingredients
To a mixture of RHOPLEX™ VSR-50 Acrylic Binder (A Trademark of The Dow Chemical Company, 75.0 g) and water (4.5 g) were added Foamstar A-34 defoamer (0.1 g) and TERGITOL™ 15-S-20 Surfactant (A Trademark of The Dow Chemical Company, 0.1 g).

C. The Drying Composition

Preparation A (the bead mix) was poured slowly with gently mixing into Preparation B (the wet pre-mix) to minimize entrainment of air bubbles. As the last portion of the bead mix was added, agitation was stopped and final beads were pushed into the mixture with a rubber spatula. To the mixture was added 0.1 g of Dow Acrysol™ RM-8W Rheology Modifier, and the mixture was mixed gently with the spatula to avoid entraining air. The product was then transferred to a plastic squeeze bottle to enable convenient dispensing.

D. Patching a Hole

The following day a test board was prepared by using a hammer to pound several ~1" dents into a piece of drywall. The drying composition was squirted out of the squirt bottle onto a 3" tape joint knife, pushed into each dent and then leveled with one quick pass of the knife. The board was left to dry overnight. The following day, the dried composition was gently sanded with a standard sanding screen and the drywall board was painted with 2 coats a waterborne house paint. The final surface appearance had good paint acceptance and was observed to contain no indent from shrinkage or cracking; and the original hammer damage was well hidden.

The invention claimed is:

1. A drying composition comprising spherical beads and a stable aqueous dispersion of polymer particles, wherein
   a) the spherical beads are characterized by: i) not being film-forming at ambient temperature; ii) having a uniformity coefficient of not greater than 1.5; and iii) having a volume average particle size in the range of from 5 to 600 μm;
   b) the dispersion of polymer particles is characterized by: i) being film-forming at ambient temperature; ii) having a solids content in the range of 10 to 65%; and iii) having a volume average particle size in the range of 100 to 500 nm;
   c) the volume of the stable aqueous dispersion of polymer particles is in the range of from 30 to 50% based on the volume of the dispersion and the beads; and
   d) wherein the drying composition is a Bingham fluid wherein the spherical beads are selected from the group consisting of polystyrene beads, styrene-butadiene copolymer beads, polystyrene-divinyl benzene beads, polyacrylate beads, polyolefin beads, polyvinyl chloride beads, polyvinylidene chloride beads and polyurea beads.

2. The drying composition of claim 1 wherein the spherical beads are polymeric beads having a uniformity coefficient of not greater than 1.2.

3. The drying composition of claim 2 wherein the spherical beads are styrene-divinyl benzene beads and the polymer particles have a $T_g$ in the range of from −40° C. to 0° C.

4. The drying composition of claim 3 wherein the spherical beads have a uniformity coefficient of not greater than 1.1, wherein the polymer particles have a volume average particle size in the range of 100 to 300 nm.

5. The drying composition of claim 3 wherein the spherical beads have a uniformity coefficient of not greater than 1.05 and the volume of the stable aqueous dispersion of polymer particles is in the range of from 35 to 45% based on the volume of the composition.

6. The drying composition of claim 5 wherein the spherical beads include pendant cationic functional groups.

7. A method of preparing a dried composition comprising the step applying the drying composition of claim 1 to a substrate and allow the drying composition to dry to form a dried composition comprising the spherical beads and a thermoplastic polymer film adhering to the spherical beads, wherein
   b) the volume of the thermoplastic polymer film is in the range of from 2 to 40 volume % based on the volume of the thermoplastic polymer and the beads; and
   c) wherein the volume of the dried composition is at least 85% the volume of the drying composition.

8. The method of claim 7 wherein the volume of polymer film is in the range of 5 to 30% based on the volume of the thermoplastic polymer and the beads.

9. The method of claim 7 wherein the spherical beads have a uniformity coefficient of not greater than 1.05 and wherein the volume of the thermoplastic polymer film is in the range of 15 to 25% based on the volume of the thermoplastic polymer and the beads.

10. The method of claim 7 wherein the spherical beads are styrene-divinyl benzene beads and wherein the volume of the dried composition is at least 95% the volume of the drying composition.

* * * * *